United States Patent
Zhou et al.

(10) Patent No.: US 10,484,641 B2
(45) Date of Patent: Nov. 19, 2019

(54) METHOD AND APPARATUS FOR PRESENTING INFORMATION, AND COMPUTER STORAGE MEDIUM

(71) Applicant: Tencent Technology (Shenzhen) Company Limited, Shenzhen (CN)

(72) Inventors: Bin Zhou, Shenzhen (CN); Xianjun Wang, Shenzhen (CN); Ping Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/946,616

(22) Filed: Apr. 5, 2018

(65) Prior Publication Data
US 2018/0227534 A1 Aug. 9, 2018

Related U.S. Application Data

(63) Continuation-in-part of application No. PCT/CN2017/071612, filed on Jan. 18, 2017.

(30) Foreign Application Priority Data

Jan. 20, 2016 (CN) .......................... 2016 1 0037173

(51) Int. Cl.
*H04N 5/445* (2011.01)
*H04N 21/431* (2011.01)
(Continued)

(52) U.S. Cl.
CPC ..... *H04N 5/44513* (2013.01); *H04N 5/44504* (2013.01); *H04N 21/431* (2013.01);
(Continued)

(58) Field of Classification Search
CPC .................. H04N 13/183; H04N 2005/44521
See application file for complete search history.

(56) References Cited

U.S. PATENT DOCUMENTS

| 6,650,828 B1* | 11/2003 | Hisatomi | G11B 27/034 |
| | | | 386/241 |
| 8,248,528 B2* | 8/2012 | Hosking | H04N 7/165 |
| | | | 348/461 |

(Continued)

FOREIGN PATENT DOCUMENTS

| CN | 101354882 A | 1/2009 |
| CN | 101383937 A | 3/2009 |

(Continued)

OTHER PUBLICATIONS

Tencent technology, ISR, PCT/CN2017/071612, dated May 19, 2017, 3 pgs.

(Continued)

*Primary Examiner* — Paulos M Natnael
(74) *Attorney, Agent, or Firm* — Morgan, Lewis & Bockius LLP

(57) ABSTRACT

A method includes: determining, when a target video is played, a presentation time point corresponding to presentation content of the target video, the presentation content and the target video having been retrieved as separate content items by the device from one or more remote servers; acquiring a display position of a closed caption of the target video and a position of a video edge that is located closest to the closed caption on the display; determining a target presentation region between the closed caption and the video edge according to the position of the closed caption and the position of the video edge; and displaying the presentation content in the target presentation region (Continued)

when the target video is played to the presentation time point corresponding to the presentation content.

20 Claims, 4 Drawing Sheets

(51) Int. Cl.
  *H04N 21/482* (2011.01)
  *H04N 21/488* (2011.01)
  *H04N 21/472* (2011.01)
(52) U.S. Cl.
  CPC ......... *H04N 21/472* (2013.01); *H04N 21/482* (2013.01); *H04N 21/488* (2013.01); *H04N 2005/44521* (2013.01); *H04N 2005/44526* (2013.01)

(56) References Cited

U.S. PATENT DOCUMENTS

| | | | | |
|---|---|---|---|---|
| 9,025,933 | B2* | 5/2015 | Hattori | H04N 21/4884 386/246 |
| 9,071,830 | B2* | 6/2015 | Okada | H04N 19/597 |
| 2002/0075403 | A1* | 6/2002 | Barone, Jr. | H04N 5/44513 348/461 |
| 2004/0047589 | A1* | 3/2004 | Kim | G09B 19/06 386/240 |
| 2005/0060145 | A1* | 3/2005 | Abe | H04N 5/04 704/211 |
| 2005/0226601 | A1* | 10/2005 | Cohen | H04N 7/165 386/263 |
| 2007/0047901 | A1* | 3/2007 | Ando | G11B 20/10527 386/241 |
| 2009/0303382 | A1* | 12/2009 | Hamada | H04N 9/8233 348/468 |
| 2010/0201871 | A1* | 8/2010 | Zhang | G06K 9/3266 348/465 |
| 2011/0037833 | A1* | 2/2011 | Lee | H04N 13/183 348/46 |
| 2011/0227911 | A1* | 9/2011 | Joo | H04N 13/156 345/419 |
| 2011/0283243 | A1* | 11/2011 | Eckhardt | G06F 3/04886 715/865 |
| 2013/0010062 | A1* | 1/2013 | Redmann | H04N 5/278 348/43 |
| 2013/0169762 | A1* | 7/2013 | Kanemaru | H04N 21/2362 348/51 |
| 2015/0277552 | A1* | 10/2015 | Wilairat | H04N 21/4884 386/244 |
| 2016/0225012 | A1* | 8/2016 | Ha | G06Q 30/0242 |
| 2017/0332035 | A1* | 11/2017 | Shah | G06F 3/167 |
| 2018/0091769 | A1* | 3/2018 | Kitazato | H04N 21/435 |
| 2018/0098002 | A1* | 4/2018 | Peterson | H04N 5/278 |
| 2018/0114566 | A1* | 4/2018 | Aoyama | G06F 3/011 |
| 2018/0160198 | A1* | 6/2018 | Watanabe | G06F 17/30017 |

FOREIGN PATENT DOCUMENTS

| | | |
|---|---|---|
| CN | 102131122 A | 7/2011 |
| CN | 103731615 A | 4/2014 |
| CN | 104519371 A | 4/2015 |
| JP | 2007243841 A | 9/2007 |

OTHER PUBLICATIONS

Tencent Technology, Written Opinion, PCT/CN2017/071612, dated May 19, 2017, 6 pgs.

Tencent Technology, IPRP, PCT/CN2017/071612, dated Jul. 24, 2018, 7 pgs.

* cited by examiner

METHOD AND APPARATUS FOR PRESENTING INFORMATION, AND COMPUTER STORAGE MEDIUM

PRIORITY CLAIM AND RELATED APPLICATION

This application is a continuation-in-part application of PCT/CN2017/071612, entitled "METHOD AND DEVICE FOR DISPLAYING INFORMATION, AND COMPUTER STORAGE MEDIUM" filed on Jan. 18, 2017, which claims priority to Chinese Patent Application No. 201610037173.X, filed with the State Intellectual Property Office of the People's Republic of China on Jan. 20, 2016, and entitled "METHOD AND DEVICE FOR DISPLAYING INFORMATION, AND COMPUTER STORAGE MEDIUM", all of which are incorporated herein by reference in their entirety.

TECHNICAL FIELD

The present disclosure relates to the field of computer technologies, and in particular, to a method and an apparatus for generating and presenting combined content using media content from multiple unrelated sources.

BACKGROUND OF THE DISCLOSURE

With the development of computer technologies and network technologies, content of online videos becomes increasingly rich. The diversified content of online videos gradually attracts extensive attention of users. When a user watches an online video by using a terminal, a service of an online video service may push presentation content such as news information and advertisement information to the terminal.

In the existing technology, multiple pieces of presentation content usually need to be set during an online video playing process. When a user watches an online video by using a terminal, each piece of presentation content covers the currently played online video in the form of a small window.

When the user is watching the online video, the presentation content covers the currently played online video in the form of a small window. Therefore, the presentation content obstructs the online video. In order to watch the online video more clearly, the user may subconsciously close the small window of the presentation content immediately, resulting in relatively low effectiveness of the presentation content.

SUMMARY

In order to resolve the problem of the existing technology, embodiments of the present technology provide a method and an apparatus for generating and presenting combined content using media content from multiple unrelated sources, and a computer storage medium. The technical solutions are as follows:

An embodiment of the present technology provides a method for generating and presenting combined content using media content from multiple unrelated sources, where the method includes:

determining, when a target video is played, a presentation time point corresponding to presentation content of the target video;

acquiring a position of a caption of the target video and a position of a video edge close to the caption, and determining a target presentation region between the caption and the video edge according to the position of the caption and the position of the video edge; and displaying the presentation content in the target presentation region when the target video is played to the presentation time point corresponding to the presentation content.

An embodiment of the present technology further provides a computer storage medium, where a computer program is stored in the computer storage medium, and the computer program is configured to execute the foregoing method for presenting information.

By using the embodiments of the present technology, when a target video is played, a presentation time point corresponding to presentation content of the target video is determined; a position of a caption of the target video and a position of a video edge close to the caption are acquired, and a target presentation region between the caption and the video edge is determined according to the position of the caption and the position of the video edge; and the presentation content is displayed in the target presentation region when the target video is played to the presentation time point corresponding to the presentation content. In this way, when the video is played, the user is not affected by the presentation content when watching the target video, and the user does not immediately close the presentation content, so that the presentation content is more effective.

BRIEF DESCRIPTION OF THE DRAWINGS

To describe the technical solutions in the embodiments of the present technology more clearly, the following briefly describes the accompanying drawings required for describing the embodiments. Apparently, the accompanying drawings in the following description show merely some embodiments of the present technology, and a person of ordinary skill in the art may still derive other drawings from these accompanying drawings without creative efforts.

DESCRIPTION OF EMBODIMENTS

To make the objectives, technical solutions, and advantages of the present disclosure clearer, the implementations of the present disclosure will be described in further detail below with reference to the accompanying drawings.

An embodiment of the present technology provides a method for generating and presenting combined content using media content from multiple sources, where the method may be executed by a terminal. The terminal may be a terminal used by a user and having a video playing capability. An application program for playing videos may be installed on the terminal. The terminal may be a smart phone, a computer, and the like. A processor, a memory, a transceiver, and so on may be disposed in the terminal. The processor may be configured to process an information presentation procedure during online video playing. The memory may be configured to store data required and data generated during the processing procedure. The transceiver may be configured to receive and send information. The terminal may be further provided with an input/output device such as a screen. The screen may be configured to display an interface of an application program, a video image, and so on. The screen may be a touch screen. The terminal may play an online video by using a video application program, or access a video website to play an online video. The presentation content may be news information and advertisement information. In this embodiment of the present technology, the solution is described in detail by using an example in which the terminal is a mobile phone and the presentation content is advertisement information of a commodity. Other situations are similar thereto, and details are not described again in this embodiment.

Figure 1:
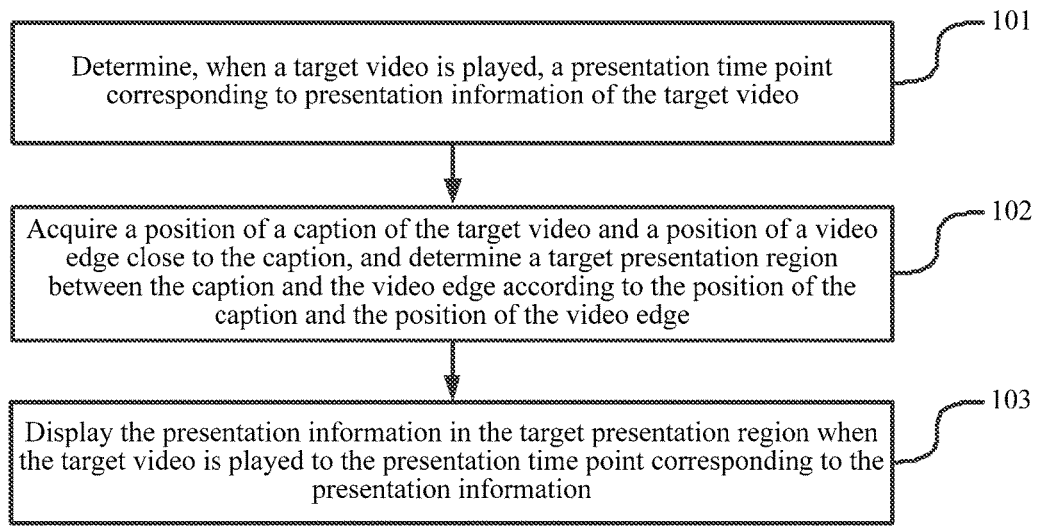
FIG. 1 is a flowchart of a method for generating and presenting combined content using media content from multiple sources according to an embodiment of the present technology.

As shown in FIG. 1, the processing procedure of the method may include the following steps:

Step 101: When a target video is played, determine a presentation time point corresponding to presentation content of the target video. In some embodiments, the video player During implementation, when a user wants to watch the target video, the user may start a video watching application program on a terminal, select the target video in a video list of the application program, and trigger the terminal to request video data from a server. After receiving the video data of the target video sent by the server, the terminal may determine the presentation time point of the presentation content set in the target video (for example, the presentation content is set at 00:10:15 of the video, and the presentation time point is 00:10:15). In some embodiments, the media player retrieves with the target video specifications of the presentation time points for the target video. In some embodiments, the presentation time points need not be specified, and presentation media may be inserted at any time point during the video playback, provided that the presentation location for the presentation media can be obtained in accordance with the method described herein.

Step 102: Acquire a position of a caption of the target video and a position of a video edge close to the caption, and determine a target presentation region between the caption and the video edge according to the position of the caption and the position of the video edge.

During implementation, the caption may be set in the video data of the target video, or the caption may be stored in a caption folder. When the target video is played to a particular time point, the caption of the current time point is acquired and displayed. After receiving the video data of the target video sent by the server, the terminal may acquire the position of the caption of the target video on the display or image frame of the video, and acquire the position of the video edge close to the caption on the display or image frame of the video. Then, the terminal determines a display region between the caption and the video edge (e.g., determine the coordinates of a rectangular region between the bottom edge of the caption and the lower edge of the video frame), and determines the target presentation region in the display region between the caption and the video edge. For example, the display region between the caption and the video edge may be used as the target presentation region, a part of the display region between the caption and the video edge may be used as the target presentation region, and so on. In some embodiments, the media player obtains the display location (e.g., the vertical coordinate of the caption on the screen) for the closed caption in a settings configuration. For example, the closed caption may be set to be displayed near the top of the image frame or near the bottom of the image frame. The media player also calculates the vertical dimension of the closed caption for the presentation time point. For example, if the closed caption needs to be displayed on multiple lines during the presentation time point, the vertical dimension of the caption is larger than if the closed caption only needs to be displayed on a single line. The media player identifies the closed caption that needs to be shown at the presentation time point, and determines the duration (e.g., how long the caption needs to remain displayed) and length (e.g., number of characters) of the closed caption that needs to be shown at the presentation time point, and determines the vertical width of the closed caption on the display. In some embodiments, media player also determines the current playback mode, e.g., whether the video is played in a full screen mode or window mode, in a portrait or landscape orientation, etc.

In an implementation of the embodiment of the present technology, the height of the display region between the caption and the video edge may be determined. Corresponding processing may be: determining the height of the display region between the caption and the video edge according to the position of the caption and the position of the video edge.

In this embodiment, the terminal may acquire the position of the caption of the target video and the position of the video edge close to the caption, and then may determine the height of the display region between the caption and the target video. For example, the caption is located at a lower part of the target video, and the terminal may determine the height of a display region between a lower edge of the caption and a lower edge of the target video.

In an implementation of the embodiment of the present technology, the height of the target presentation region may be determined according to the height of the display region. Corresponding processing may be: determining a product of the height of the display region and a preset proportion value as the height of the target presentation region.

During implementation, a preset proportion value between the height of the target presentation region and the height of the display region may be set and stored in the video data of the target video, or stored in the presentation content. After acquiring the video data of the target video, the terminal may acquire, from the video data, the preset proportion value between the height of the target presentation region and the height of the display region. After acquiring the height of the display region, the terminal multiplies the height of the display region by the preset proportion value to obtain the height of the target presentation region. For example, if the acquired preset proportion value between the height of the target presentation region and the height of the display region is ⅔, and the height of the display region is 3 cm, the terminal obtains through calculation that the height of the target presentation region is 2 cm.

In an implementation of the embodiment of the present technology, the target presentation region is determined between the caption and the video edge according to the height of the target presentation region.

During implementation, after acquiring the height of the target presentation region, the terminal may determine a central position point of the display region, and then determine the central position point of the display region as a central position point of the target presentation region. In this way, the height and the central position point of the target presentation region can be determined. The target presentation region is a rectangular region which is in the display region and centrally symmetrical about the central position point, and the height thereof is the height of the target presentation region.

In addition, a preset proportion value between the width of the target presentation region and the width of the display region may be set, and stored in the video data of the target video or stored in the presentation content. After acquiring the height of the target presentation region, the terminal may acquire the width of the display region (that is, the width of a playing image of the target video) between the caption and the video edge, and then multiply the width of the display region by the preset proportion value, to obtain the width of the target presentation region. In addition, the terminal determines a central position point of the display region, and determines the central position point of the display region as a central position point of the target presentation region. In this way, the target presentation region is a rectangular region which is in the display region and centrally symmetrical about the central position point. The height of the rectangular region is the height of the target presentation region, and the width thereof is the width of the target presentation region.

In an implementation of the embodiment of the present technology, the target presentation region may be determined between the caption of the target video and a lower edge of the target video. Corresponding processing may be: displaying the caption of the target video at a lower part of the target video; and determining the target presentation region between the caption of the target video and the lower edge of the video according to the position of the caption and the position of the lower edge of the video.

During implementation, the caption of the target video may be disposed at the lower part of the target video, and the caption may be directly set in the video data of the target video or the caption is stored in a folder. When the target video is played to a particular time point, the caption of the current time point is acquired and displayed. A preset proportion value between the width of the target presentation region and the width of the display region may be set, and a preset proportion value between the height of the target presentation region and the height of the display region may be set.

In some embodiments, the media player identify the target presentation region between the closed caption and the edge of the display region that is closest to the closed caption. In some embodiments, the media player will only identify the target presentation region if the media player has determined that the closed caption is shown in a single line. In some embodiments, if the closed caption is determined to be shown in multiple lines at the presentation time point, the media player shifts the presentation time point along the timeline of the target video to a new time point where there is no closed caption on display or where the closed caption is displayed in a single line. In some embodiments, if the media player determines that there is no closed caption on display at the presentation time point, the media player expands the target presentation region to occupy the display region for a single line of closed caption and the display region below the closed caption. In some embodiments, if the media player identifies that there is a time period that is within a threshold duration of the original presentation time point for which there is no closed caption on display, the media player shifts the presentation time point to the time point where there is no closed caption on display, such that the presentation content is displayed at a larger size, and/or without distraction from the concurrently displayed closed caption. In some embodiments, the media player determines the time duration between two periods of time during which closed captions will be displayed, and determine the display time of the presentation content to fit within that time duration. In some embodiments, the media player optionally shrinks the display size of the presentation content that is already shown on the screen to slide it in between the space between the closed caption and the edge of the display region, when the closed caption comes onto the screen at the display time of the closed caption.

Figure 2:
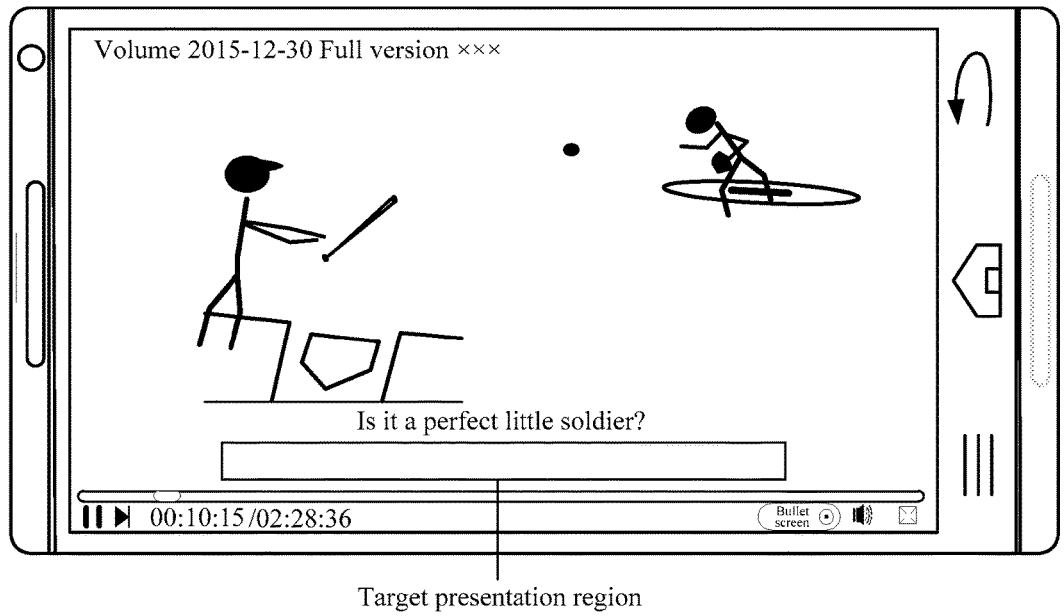
FIG. 2 is a schematic diagram of a target presentation region according to an embodiment of the present technology.

As shown in FIG. 2, after acquiring the video data of the target video, the terminal may determine that the caption is located at the lower part of the target video. The terminal may further acquire that an edge position of the target video close to the caption is the position of the lower edge, and may measure a current display size of the target video. Then, the terminal determines the height and width of the display region between the position of the caption and the position of the lower edge, calculates the height and width of the target presentation region according to the preset proportion values, determines a central position point of the display region according to the height and width of the display region, and uses the central position point as a central position point of the target presentation region. In this way, the target presentation region is a rectangular region which is in the display region and centrally symmetrical about the central position point. The height of the rectangular region is the height of the target presentation region, and the width thereof is the width of the target presentation region.

Step 103: Display the presentation content in the target presentation region when the target video is played to the presentation time point corresponding to the presentation content.

Figure 3:
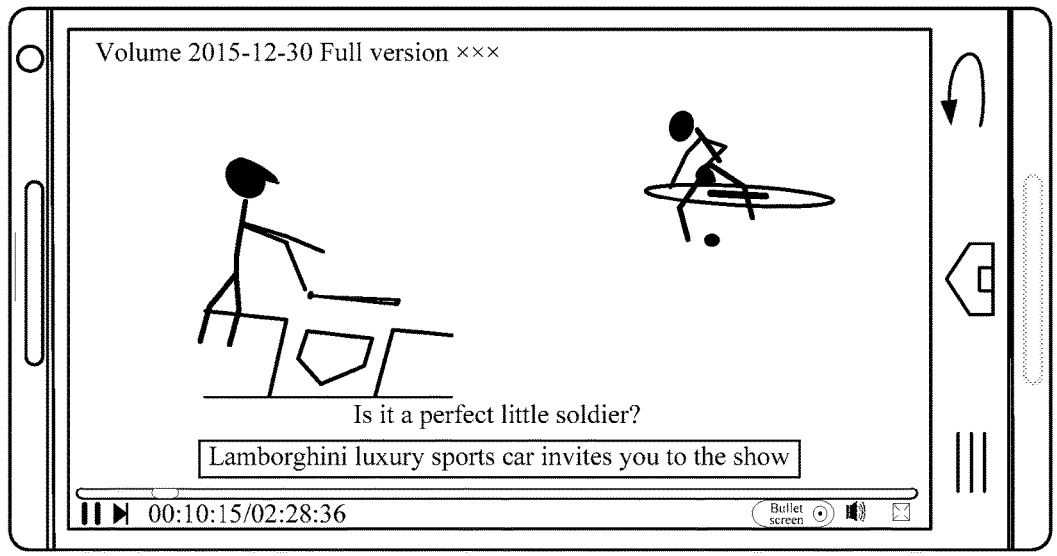
FIG. 3 is a schematic diagram of an interface for presenting information according to an embodiment of the present technology.

During implementation, when the target video is played to the presentation time point corresponding to the presentation content, the terminal may acquire the presentation content corresponding to the presentation time point (for example, acquiring the presentation content corresponding to the presentation time point from the server). After acquiring the presentation content, the terminal may acquire the determined target presentation region, and then display the presentation content in the target presentation region. For example, as shown in FIG. 3, the presentation time point is 00:10:15, and when the target video is played to 00:10:15, the terminal may acquire presentation content "Lamborghini luxury sports car invites you to the show" at 00:10:15, and then display "Lamborghini luxury sports car invites you to the show" in the target presentation region.

In addition, when the target video is played to the presentation time point corresponding to the presentation content, the terminal currently playing the target video may be detected. If the currently used terminal is a mobile phone, it is further detected whether the mobile phone is in a vertical-screen state. If the mobile phone currently plays the target video with a vertical screen, the presentation content is not displayed. If the mobile phone currently plays the target video with a horizontal screen (the target video is played with full screen), the presentation content is displayed. If the currently used terminal is a tablet computer, the presentation content is directly displayed. In some embodiments, the media player overlays the presentation content in the target presentation region in accordance with a determination that the media player is running on a display device with a first form factor (e.g., a smart phone); the media player overlays the presentation content in a region outside of the video frame of the target view in a floating window in accordance with a determination that the media player is running on a display device with a second form factor that is larger than the first form factor (e.g., a tablet device).

In addition, a presentation size of the presentation content may further be adjusted according to a display size of the target video. Corresponding process may be as follows:

When acquiring the presentation content of the target video, the terminal may measure the current display size of the target video, acquire a preset proportion (such as 5.5%) of the presentation size to the display size, and then calculate the presentation size of the presentation content according to the display size of the target video. When the target video is played to the presentation time point corresponding to the presentation content, the presentation content is displayed in the target presentation region according to the presentation size corresponding to the presentation content.

In an implementation of the embodiment of the present technology, the presentation content may be acquired when the target video is played to second preset duration prior to the presentation time point, or locally stored presentation content of the target video may be acquired. Corresponding processing may be: acquiring the presentation content of the target video from the server when the target video is played to second preset duration prior to the presentation time point; or acquiring the presentation content of the target video when the target video is played to the presentation time point corresponding to the presentation content, the presentation content being locally stored.

During implementation, second preset duration may be set. When the target video is played to the second preset duration prior to the presentation time point, the terminal may acquire the corresponding to the presentation time point.

When the target video is played to the second preset duration prior to the presentation time point, the terminal may send, to the server, an acquisition request for the presentation content corresponding to the presentation time point. The acquisition request carries a video identifier of the target video and the presentation time point. After receiving the acquisition request, the server may search a presentation content set corresponding to the video identifier of the target video, then acquire the presentation content corresponding to the presentation time point from the presentation content set, and then send the presentation content corresponding to the presentation time point to the terminal. After receiving the presentation content, the terminal may display the presentation content in the target presentation region when the video is played to the presentation time point.

Alternatively, while acquiring the video data of the target video, the terminal may also acquire the presentation content of the target video, and then store the acquired presentation content in the terminal. When the target video is played to the presentation time point corresponding to the presentation content, the terminal may determine the presentation content corresponding to the presentation time point from the locally stored presentation content of the target video according to the presentation time point, and then may display the presentation content in the target presentation region.

In an implementation of the embodiment of the present technology, the presentation content may be displayed in a semi-transparent form. Corresponding processing may be: when the target video is played to the presentation time point corresponding to the presentation content, displaying the presentation content in a semi-transparent form in the target presentation region.

During implementation, the presentation content may be set in a semi-transparent form. When the target video is played to the presentation time point corresponding to the presentation content, the terminal may acquire the presentation content corresponding to the presentation time point, and then display the presentation content in a semi-transparent form in the target presentation region. In this way, only a small part of the image of the target video is obstructed by the presentation content. For example, the presentation content is "Rouge Dior Crème De Gloss invites you", and the background of "Rouge Dior Crème De Gloss invites you" is transparent.

Figure 4:
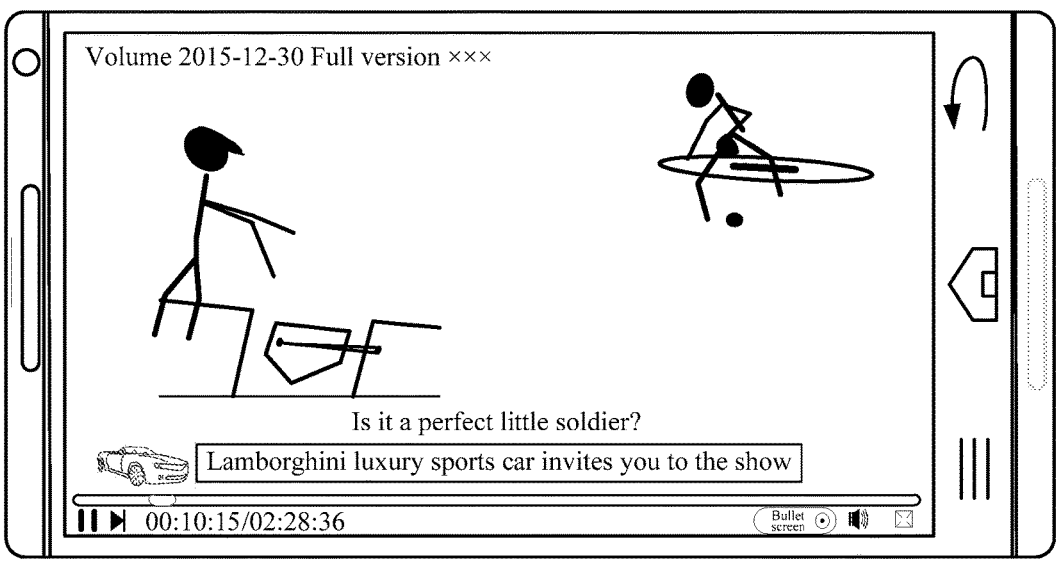
FIG. 4 is a schematic diagram of an interface for presenting information according to an embodiment of the present technology.

In addition, the presentation content may further include a picture of a commodity to be presented. For example, as shown in FIG. 4, the commodity to be presented in the presentation content is a Lamborghini luxury sports car. When the presentation content is displayed in the target video, in addition to "Lamborghini luxury sports car invites you to the show", a picture of the Lamborghini luxury sports car may also be displayed. In some embodiments, when the length of the presentation content is longer than the closed caption that is currently displayed on the screen, the media player optionally enlarges the image of the sports car at the end of the presentation content, such that the image occupies a vertical height of the closed caption and at least a portion of the space between the closed caption and the edge of the display region that is closest to the closed caption. The media player dynamically expands and contracts the end image of the presentation content in accordance with the relative length of the closed caption and the presentation content (e.g., expand the end image if the closed caption is shorter than the presentation content, and contract the end image if the closed caption is longer than the presentation content).

In an implementation of the embodiment of the present technology, when a playing progress of the target video is within a range of third preset duration after the presentation time point, displaying of the presentation content may be triggered. Corresponding processing may be: displaying the presentation content in the target presentation region when the playing progress of the target video is adjusted into the range of the third preset duration after the presentation time point.

During implementation, when the target video is played, a playing progress bar is displayed in a playing interface, and the user may drag the playing progress bar, to enable the terminal to play video data at any time point of the target video. The range of the third preset duration may be set (such as 10 seconds). When the playing progress of the target video is adjusted into the range of the third preset duration after the presentation time point, the terminal may acquire the presentation content corresponding to the presentation time point, and display the presentation content.

When the user wants to fast forward the target video, the user may drag the playing progress bar displayed in the playing interface of the target video. When the terminal detects that the playing progress is adjusted into the range of the third preset duration after the presentation time point, the terminal may acquire the presentation content corresponding to the presentation time point, then acquire the target presentation region corresponding to the presentation content, and display the presentation content in the target presentation region. For example, the presentation time point is 00:10:15, and the range of the third preset duration is 0 to 10 seconds. When the playing progress is adjusted into the range of 00:10:15 to 00:10:25, the terminal may acquire the presentation content "Lamborghini luxury sports car invites you to the show" corresponding to 00:10:15. When acquiring the presentation content corresponding to 00:10:15, the terminal displays "Lamborghini luxury sports car invites you to the show" in the target presentation region.

In addition, when detecting that the playing progress is adjusted into the range of the third preset duration after the presentation time point, the terminal may determine whether the presentation content corresponding to the presentation time point has been played during current playing of the target video. If determining that the presentation content has not been played, the terminal acquires the presentation content corresponding to the presentation time point, and then displays the presentation content in the target presentation region.

In addition, when the user wants to fast forward the target video, the user may drag the playing progress bar displayed in the playing interface of the target video. When detecting that the playing progress is adjusted into the range of fourth preset duration prior to the presentation time point (where the range of the third preset duration may be the same as the range of the fourth preset duration), the terminal may determine whether the presentation content corresponding to the presentation time point has been played during current playing of the target video. If determining that the presentation content has not been played, the terminal acquires the presentation content corresponding to the presentation time point, and then displays the presentation content in the target presentation region.

In an implementation of the embodiment of the present technology, the terminal may control the presentation content to be displayed starting from a side edge. Corresponding processing may be: displaying the presentation content from a side edge of the target video, and controlling the presentation content to move to the target presentation region.

Figure 5:
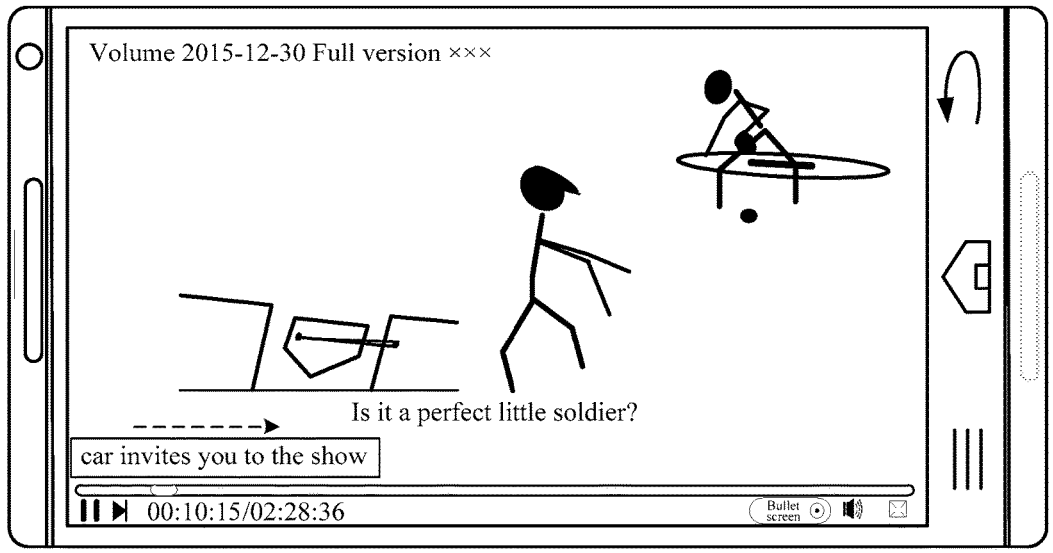
FIG. 5 is a schematic diagram of an interface for presenting information according to an embodiment of the present technology.

During implementation, after the terminal acquires the presentation content corresponding to the presentation time point and the target video is played to the presentation time point, the terminal may control the presentation content to enter the playing interface of the target video from a side edge (such as the left side edge or the right side edge) of the target video, and may control the presentation content to horizontally move to the target presentation region. For example, as shown in FIG. 5, the presentation time point is 00:10:15. When the target video is played to 00:10:15, the terminal may acquire the presentation content "Lamborghini luxury sports car invites you to the show" at 00:10:15, and control "Lamborghini luxury sports car invites you to the show" to horizontally move from the left side edge of the target video to the target presentation region.

In addition, entering duration of the presentation content may be preset. The terminal may control the presentation content to move from the side edge of the target video to the target presentation region within the entering duration. For example, the terminal may control the presentation content to move from the side edge of the target video to the target presentation region within 5 seconds.

In an implementation of the embodiment of the present technology, the terminal may display detailed information corresponding to the presentation content. Corresponding processing may be: acquiring and displaying the detailed information corresponding to the presentation content when a trigger instruction input by the user and corresponding to the presentation content is detected.

During implementation, when the presentation content is displayed in the playing interface of the target video, the user may click the presentation content. When receiving a trigger instruction corresponding to the user's click on the presentation content, the terminal may acquire detailed information of the presentation content (for example, loading a webpage, a news report, and so on including the commodity in the presentation content), then display the detailed information corresponding to the presentation content at a layer above the playing interface of the target video, and may still play the target video at the same time.

In an implementation of the embodiment of the present technology, the terminal may cancel displaying of the presentation content. Corresponding processing may be: canceling displaying of the presentation content when display duration of the presentation content reaches first preset duration.

During implementation, the first preset duration (such as 5 seconds) may be set. When detecting that the presentation content is displayed in the target presentation region for the first preset duration, the terminal may cancel displaying of the information.

After the presentation content is displayed in the target presentation region for the first preset duration, the terminal may cancel displaying of the information, that is, the terminal may control the presentation content to disappear from the playing interface of the target video. For example, after the presentation content is displayed in the target presentation region for 5 seconds, the terminal may control the presentation content to directly disappear from the target presentation region.

In an implementation of the embodiment of the present technology, the terminal may cancel displaying of the information from a side edge of the target video. Corresponding processing may be: controlling the presentation content to move towards a side edge of the target video, and canceling displaying of the presentation content when the presentation content is moved to the side edge.

Figure 6:
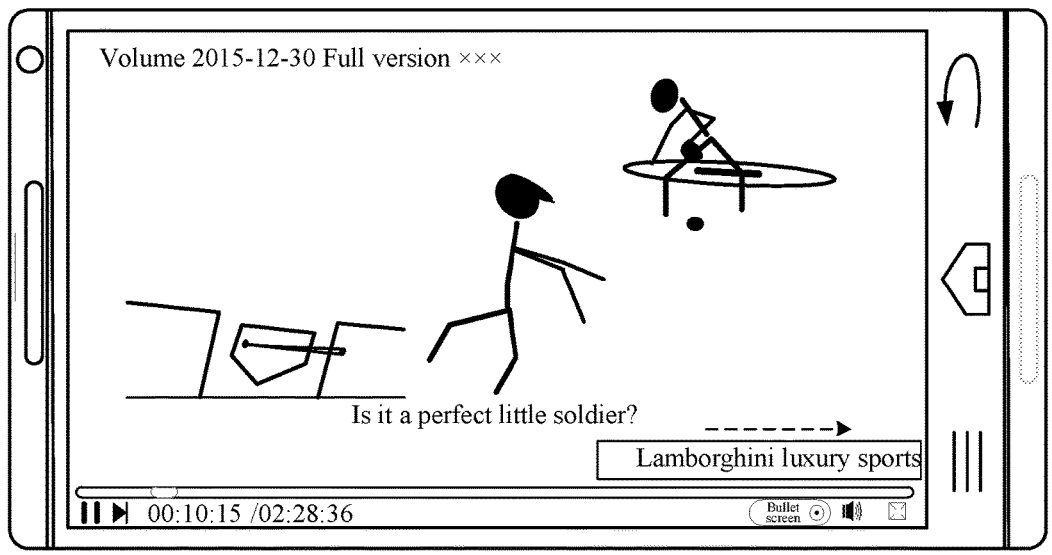
FIG. 6 is a schematic diagram of an interface for presenting information according to an embodiment of the present technology.

During implementation, when detecting that the presentation content is displayed in the target presentation region for the first preset duration, the terminal may control the presentation content to move towards a side edge of the target video, and when the presentation content moves to the side edge of the target video (for example, when the left edge of the presentation content moves to the right side edge of the target video), the terminal may cancel displaying of the presentation content. For example, as shown in FIG. 6, the presentation time point is 00:10:15. When detecting that the presentation content is displayed in the target presentation region for 5 seconds, the terminal may control the presentation content to move towards the right side edge of the target video, and when the left edge of the presentation content moves to the right side edge of the target video, the terminal may cancel displaying of the presentation content.

In addition, a moving speed of the presentation content may be preset, that is, duration from the moment when the presentation content starts to move towards the side edge of the target video to the moment when the presentation content disappears may be preset, for example, the duration is 5 seconds.

In this embodiment of the present technology, when a target video is played, a presentation time point corresponding to presentation content of the target video is determined; a position of a caption of the target video and a position of a video edge close to the caption are acquired, and a target presentation region between the caption and the video edge is determined according to the position of the caption and the position of the video edge; and the presentation content is displayed in the target presentation region when the target video is played to the presentation time point corresponding to the presentation content. In this way, when the video is played, the user is not affected by the presentation content when watching the target video, and the user does not immediately close the presentation content, so that the presentation content is more effective.

Based on the above, in some embodiments, a method is performed at a device having one or more processors, memory, and a display. The method includes: determining, when a target video is played, a presentation time point corresponding to presentation content of the target video, the presentation content and the target video having been retrieved as separate content items by the device from one or more remote servers; acquiring a display position of a closed caption of the target video and a position of a video edge that is located closest to the closed caption on the display; determining a target presentation region between the closed caption and the video edge according to the position of the closed caption and the position of the video edge; and displaying the presentation content in the target presentation region when the target video is played to the presentation time point corresponding to the presentation content.

In some embodiments, acquiring a display position of the closed caption of the target video and a position of a video edge that is located closest to the closed caption on the display includes: identifying a particular piece of closed caption that is to be displayed in the target video at the presentation time point corresponding to the presentation content; and determining a boundary position of the particular piece of closed caption that is to be displayed in the target video at the presentation time point corresponding to the presentation content.

In some embodiments, the displaying the presentation content in the target presentation region when the target video is played to the presentation time point corresponding to the presentation content comprises: displaying the presentation content starting from a side edge of the target video, and controlling the presentation content to move to the target presentation region.

In some embodiments, the method further include: after the presentation content is displayed concurrently with a particular piece of closed caption: detecting that the particular piece of closed caption ceases to be displayed on the display; and in response to detecting that the particular piece of closed caption ceases to be displayed on the display, expanding a size of the presentation content when no closed caption is displayed concurrently with the presentation content.

In some embodiments, the method further include: in accordance with a determination that display duration of the presentation content reaches first preset duration: controlling the presentation content to move towards a side edge of the target video; and canceling displaying of the presentation content when the presentation content moves to the side edge.

In some embodiments, the method further include: displaying the presentation content in the target presentation region when a playing progress of the target video is adjusted into a predefined range of after the presentation time point.

In some embodiments, the method further include: acquiring and displaying detailed information corresponding to the presentation content when a trigger instruction input by a user and corresponding to the presentation content is detected, wherein the trigger instruction input includes a contact with a touch-sensitive surface at a location corresponding to a region including both the location of the closed caption and the location of the presentation content.

Other details of the method are disclosed with respect to other embodiments described herein, and may be combined with the features disclosed herein in any reasonable manner.

Figure 7:
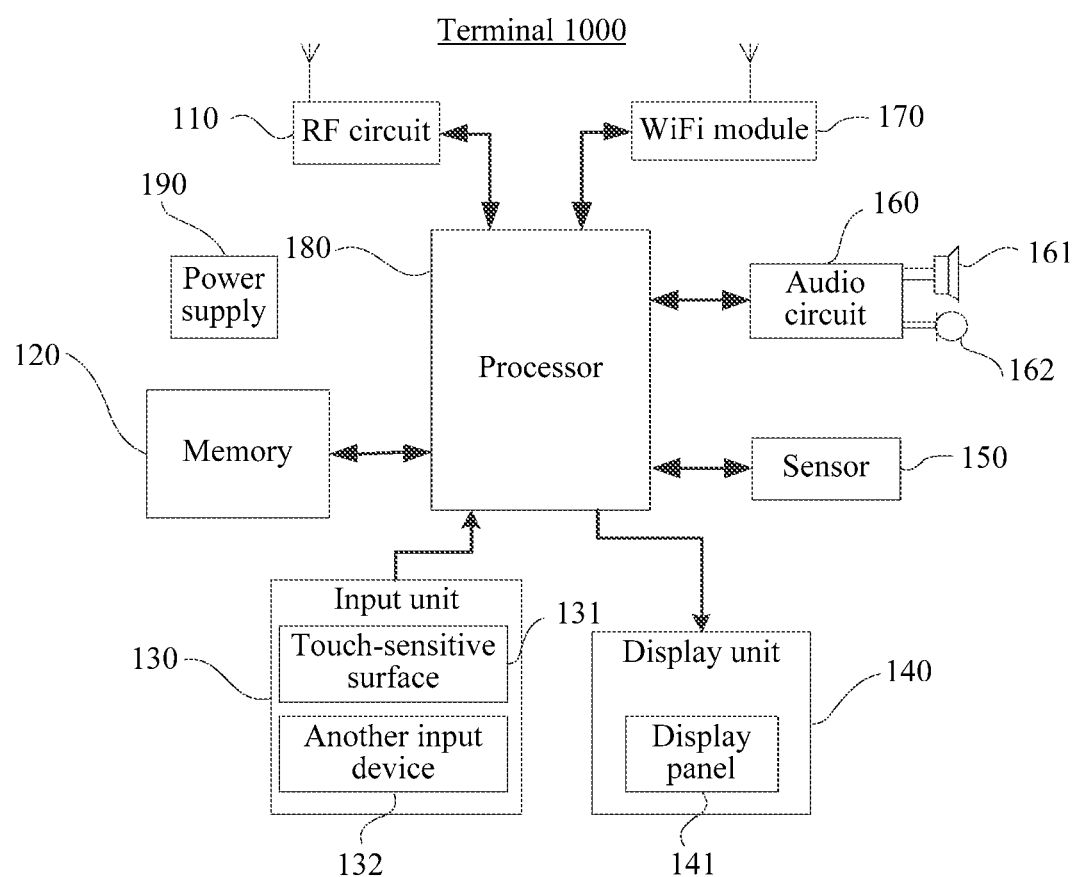
FIG. 7 is a schematic structural diagram of an apparatus for presenting information according to an embodiment of the present technology.

Referring to FIG. 7, FIG. 7 is a schematic structural diagram of a terminal involved in an embodiment of the present technology. The terminal may be a smart phone, a tablet computer, or the like, and may be configured to implement the method for executing operation processing provided in the foregoing embodiment. Specifically:

The terminal 1000 may include components such as a radio frequency (RF) circuit 110, a memory 120 including one or more computer readable storage media, an input unit 130, a display unit 140, a sensor 150, an audio circuit 160, a wireless communications (WiFi) unit 170, a processor 180 including one or more processing cores, and a power supply 190. A person skilled in the art may understand that the terminal structure o shown in FIG. 10 does not constitute a limitation to the terminal, and the terminal may include more components or fewer components than those shown in the figure, or some components may be combined, or a different component deployment may be used.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1000, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1000. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 1000 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1000 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1000 are not further described herein.

The audio circuit 160, a loudspeaker 161, and a microphone 162 may provide audio interfaces between the user and the terminal 1000. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1000.

WiFi is a short distance wireless transmission technology. The terminal 1000 may help, by using the wireless communications unit 170, a user to receive and send an e-mail, browse a webpage, and access stream media, and the like, which provides wireless broadband Internet access for the user. Although FIG. 10 shows the wireless communications unit 170, it may be understood that, the wireless communications unit is not a necessary component of the terminal 1000, and can be ignored according to demands without changing the scope of the essence of the present disclosure.

The processor 180 is a control center of the terminal 1000, and connects various parts of the terminal by using various interfaces and lines. By running or executing the software program and/or module stored in the memory 120, and invoking data stored in the memory 120, the processor 180 performs various functions and data processing of the terminal 1000, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1000 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 1000 may further include a camera, a Bluetooth module, and the like, which are not further described herein. Specifically, in this embodiment, the display unit of the terminal 1000 is a touch screen display, and the terminal 1000 further includes a memory and one or more programs. The one or more programs are stored in the memory and configured to be executed by one or more processors. The one or more programs contain instructions used for performing the methods described herein with respect to various embodiments of the present technology. A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present technology, but are not intended to limit the present disclosure. Any modification, equivalent replacement, or improvement made within the spirit and principle of the present technology shall fall within the protection scope of the present disclosure.

What is claimed is:

1. A method, comprising:
at a device having one or more processors, memory, and a display:
determining, when a target video is played, a presentation time point corresponding to presentation content of the target video, the presentation content and the target video having been retrieved as separate content items by the device from one or more remote servers;
acquiring a display position of a closed caption of the target video on the display and a position of a video edge that is located closest to the closed caption on the display and that extends in a first direction parallel to the closed caption;
determining a target presentation region between the closed caption and the video edge according to the display position of the closed caption and the position of the video edge on the display;
displaying the presentation content in the target presentation region when the target video is played to the presentation time point corresponding to the presentation content, wherein displaying the presentation content in the target presentation region includes controlling the presentation content to move in the first direction parallel to the closed caption while remaining between the closed caption and the video edge that is located closest to the closed caption on the display;
while playing the target video and controlling the presentation content to move on the display, detecting a user selection of the moving presentation content within the target presentation region; and
in response to the user selection, acquiring and displaying detailed information of the presentation content to overlay a playing interface of the target video while continuing to play the target video.

2. The method according to claim 1, wherein acquiring a display position of the closed caption of the target video and a position of a video edge that is located closest to the closed caption on the display include:
identifying a particular piece of closed caption that is to be displayed in the target video at the presentation time point corresponding to the presentation content; and
determining a boundary position of the particular piece of closed caption that is to be displayed in the target video at the presentation time point corresponding to the presentation content.

3. The method according to claim 1, wherein the displaying the presentation content in the target presentation region when the target video is played to the presentation time point corresponding to the presentation content comprises:
displaying the presentation content starting from a side edge of the target video, and
controlling the presentation content to move to the target presentation region.

4. The method according to claim 1, further comprising:
after the presentation content is displayed concurrently with a particular piece of closed caption:
detecting that the particular piece of closed caption ceases to be displayed on the display;
in response to detecting that the particular piece of closed caption ceases to be displayed on the display, expanding a size of the presentation content when no closed caption is displayed concurrently with the presentation content.

5. The method according to claim 1, including:
in accordance with a determination that display duration of the presentation content reaches first preset duration:
controlling the presentation content to move towards a side edge of the target video; and
canceling displaying of the presentation content when the presentation content moves to the side edge.

6. The method according to claim 1, further comprising:
displaying the presentation content in the target presentation region when a playing progress of the target video is adjusted into a predefined range of the presentation time point.

7. The method according to claim 1,
wherein the user selection includes a contact with a touch-sensitive surface at a location corresponding to a region including both the location of the closed caption and the location of the presentation content.

8. A device, comprising:
one or more processors, memory, and a display, wherein the memory stores instructions that when executed by the one or more processors, cause the processors to perform operations comprising:
determining, when a target video is played, a presentation time point corresponding to presentation content of the target video, the presentation content and the target video having been retrieved as separate content items by the device from one or more remote servers;
acquiring a display position of a closed caption of the target video on the display and a position of a video edge that is located closest to the closed caption on the display and that extends in a first direction parallel to the closed caption;
determining a target presentation region between the closed caption and the video edge according to the display position of the closed caption and the position of the video edge on the display;
displaying the presentation content in the target presentation region when the target video is played to the presentation time point corresponding to the presentation content, wherein displaying the presentation content in the target presentation region includes controlling the presentation content to move in the first direction parallel to the closed caption while remaining between the closed caption and the video edge that is located closest to the closed caption on the display;
while playing the target video and controlling the presentation content to move on the display, detecting a user selection of the moving presentation content within the target presentation region; and
in response to the user selection, acquiring and displaying detailed information of the presentation content to overlay a playing interface of the target video while continuing to play the target video.

9. The device according to claim 8, wherein acquiring a display position of the closed caption of the target video and a position of a video edge that is located closest to the closed caption on the display include:
- identifying a particular piece of closed caption that is to be displayed in the target video at the presentation time point corresponding to the presentation content; and
- determining a boundary position of the particular piece of closed caption that is to be displayed in the target video at the presentation time point corresponding to the presentation content.

10. The device according to claim 8, wherein the displaying the presentation content in the target presentation region when the target video is played to the presentation time point corresponding to the presentation content comprises:
- displaying the presentation content starting from a side edge of the target video, and
- controlling the presentation content to move to the target presentation region.

11. The device according to claim 8, wherein the operations further comprise:
- after the presentation content is displayed concurrently with a particular piece of closed caption:
  - detecting that the particular piece of closed caption ceases to be displayed on the display;
  - in response to detecting that the particular piece of closed caption ceases to be displayed on the display, expanding a size of the presentation content when no closed caption is displayed concurrently with the presentation content.

12. The device according to claim 8, wherein the operations further include:
- in accordance with a determination that display duration of the presentation content reaches first preset duration:
  - controlling the presentation content to move towards a side edge of the target video; and
  - canceling displaying of the presentation content when the presentation content moves to the side edge.

13. The device according to claim 8, wherein the operations further comprise:
- displaying the presentation content in the target presentation region when a playing progress of the target video is adjusted into a predefined range of the presentation time point.

14. The device according to claim 8,
wherein the user selection includes a contact with a touch-sensitive surface at a location corresponding to a region including both the location of the closed caption and the location of the presentation content.

15. A non-transitory computer-readable storage medium storing instructions that when executed by one or more processors, cause the processors to perform operations comprising:
- determining, when a target video is played, a presentation time point corresponding to presentation content of the target video, the presentation content and the target video having been retrieved as separate content items by the device from one or more remote servers;
- acquiring a display position of a closed caption of the target video on the display and a position of a video edge that is located closest to the closed caption on the display and that extends in a first direction parallel to the closed caption;
- determining a target presentation region between the closed caption and the video edge according to the display position of the closed caption and the position of the video edge on the display;
- displaying the presentation content in the target presentation region when the target video is played to the presentation time point corresponding to the presentation content, wherein displaying the presentation content in the target presentation region includes controlling the presentation content to move in the first direction parallel to the closed caption while remaining between the closed caption and the video edge that is located closest to the closed caption on the display;
- while playing the target video and controlling the presentation content to move on the display, detecting a user selection of the moving presentation content within the target presentation region; and
- in response to the user selection, acquiring and displaying detailed information of the presentation content to overlay a playing interface of the target video while continuing to play the target video.

16. The non-transitory computer-readable storage medium according to claim 15, wherein acquiring a display position of the closed caption of the target video and a position of a video edge that is located closest to the closed caption on the display include:
- identifying a particular piece of closed caption that is to be displayed in the target video at the presentation time point corresponding to the presentation content; and
- determining a boundary position of the particular piece of closed caption that is to be displayed in the target video at the presentation time point corresponding to the presentation content.

17. The non-transitory computer-readable storage medium according to claim 15, wherein the displaying the presentation content in the target presentation region when the target video is played to the presentation time point corresponding to the presentation content comprises:
- displaying the presentation content starting from a side edge of the target video, and
- controlling the presentation content to move to the target presentation region.

18. The non-transitory computer-readable storage medium according to claim 15, wherein the operations further comprise:
- after the presentation content is displayed concurrently with a particular piece of closed caption:
  - detecting that the particular piece of closed caption ceases to be displayed on the display;
  - in response to detecting that the particular piece of closed caption ceases to be displayed on the display, expanding a size of the presentation content when no closed caption is displayed concurrently with the presentation content.

19. The non-transitory computer-readable storage medium according to claim 15, wherein the operations further include:
- in accordance with a determination that display duration of the presentation content reaches first preset duration:
  - controlling the presentation content to move towards a side edge of the target video; and
  - canceling displaying of the presentation content when the presentation content moves to the side edge.

20. The non-transitory computer-readable storage medium according to claim 15, wherein the operations further comprise:
- displaying the presentation content in the target presentation region when a playing progress of the target video is adjusted into a predefined range of the presentation time point.

* * * * *